Nov. 16, 1965 M. W. SHARP 3,218,477
TRIGGERING ARRANGEMENT FOR MULTIVIBRATORS
Filed Feb. 25, 1963
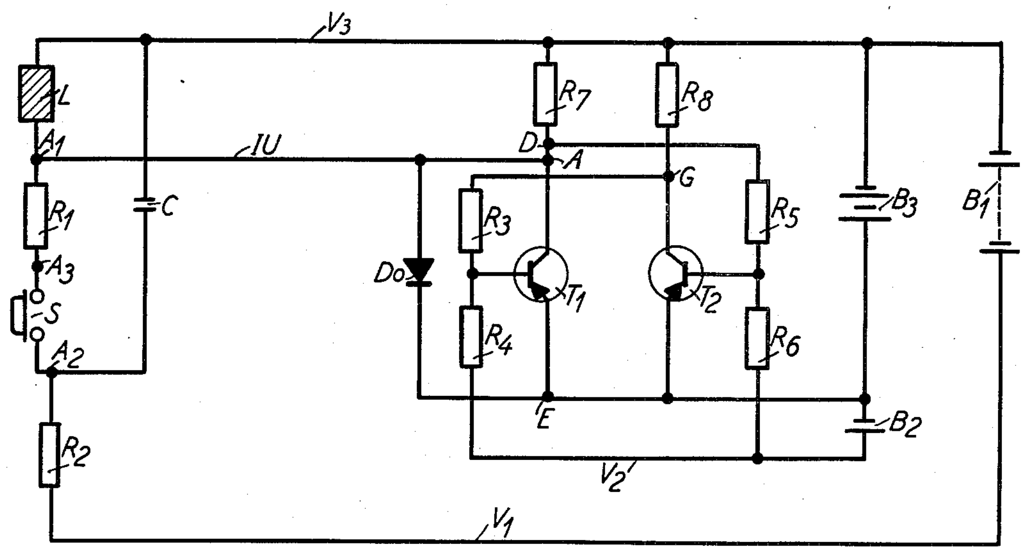
INVENTOR.
MICHAEL WILLIAM SHARP
BY
H. B. Willson & Co.
Attorney 3,218,477

TRIGGERING ARRANGEMENT FOR MULTIVIBRATORS

Michael William Sharp, 3 Lehwaldsvej, Kongens Lyngby, Denmark

Filed Feb. 25, 1963, Ser. No. 260,492
6 Claims. (Cl. 307—88.5)

This invention relates to an electric circuit arrangement of the kind comprising a triggering circuit for controlling the operation of a transistor multivibrator or switch.

For reliability in an arrangement of the kind referred to it is preferred to operate the triggering circuit at a voltage substantially higher than the voltages employed in the multivibrator; a disadvantage in such a known arrangement is that in addition to return paths, two separate leads are normally required for carrying trigger signals to the multivibrator circuit and for carrying output current from the multivibrator circuit to a load.

In transistorized elevator controls, it is the usual practice to group the transistor multivibrator circuits at the top of a building at considerable distances from the respective landings where the triggering controls and the indicator loads are located. Consequently, it is important to use only the smallest possible number of leads.

Therefor, an object of the present invention is to provide an improved multivibrator triggering arrangement in which a single lead fulfils the function of the above-mentioned two separate leads.

According to the invention an electric circuit arrangement comprising a triggering circuit connected to a transistor multivibrator or switching circuit is characterized in that the triggering circuit includes a source of voltage which is substantially higher than the voltage supplies employed in the multivibrator circuit, a resistance connected to said source, and two circuit branches both connected to a return lead and in parallel with each other and in series with said resistance, one of said circuit branches including a capacitor, and the other of said circuit branches including in series a switch and a second resistance and a load in that order, a single lead being connected to a point between said second resistance and said load and to said multivibrator circuit and serving both for carrying trigger signals from the triggering circuit to the multivibrator and for carrying output currents from the multivibrator to said load.

In the accompanying drawing a circuit diagram of an electric circuit arrangement in accordance with the invention is shown by way of example.

Referring now to the drawing, the negative terminal of a first source of direct-current voltage $B_1$ is connected with one end of load L via conductor $V_3$. The positive terminal of the source $B_1$ is connected with the other end of the load via the conductive path including conductor $V_1$, resistor $R_2$, junction $A_2$, switch S, point $A_3$, resistor $R_1$ and junction $A_1$. A capacitor C is connected in parallel across the series branch including switch S, resistor $R_1$ and load L.

The negative terminal of another direct-current voltage source $B_3$, having a potential smaller than that of the first source $B_1$, is connected with conductor $V_3$. The positive terminal of this source B is connected with the emitters of a pair of transistors $T_1$ and $T_2$ that are connected to define a conventional multivibrator. More specifically, the collector of transistor $T_1$ is connected with conductor $V_3$ via junctions A and D and resistor $R_7$, and the collector of transistor $T_2$ is connected with conductor $V_3$ via junction G and resistor $R_8$. Furthermore, the collector of transistor $T_1$ is connected with the base of transistor $T_2$ via junction D and resistor $R_5$, and the collector of transistor $T_2$ is connected with the base of transistor $T_1$ via junction G and resistor $R_3$.

Another source of direct-current voltage $B_2$, having a lower potential than the potentials of sources $B_1$ and $B_3$, has a negative terminal connected with the emitters of transistors $T_1$ and $T_2$ and a positive terminal connected with the base electrodes of these transistors via resistors $R_4$ and $R_6$, respectively. It is apparent that resistors $R_3$, $R_4$ and $R_5$, $R_6$ define conventional voltage divider means.

In accordance with the present invention, the means for supplying triggering or switching pulses to the multivibrator comprises a single conductor IU connected at one end with the triggering circuit at junction $A_1$ between resistor $R_1$ and load L, and at the other end with the multivibrator at the collector of transistor $T_1$ via junction A. Diode $D_0$ is connected at one end with the single conductor IU and at the other end with the emitter of transistor $T_1$ via junction E. This diode prevents the collector of transistor $T_1$ from being exposed to an excessive positive potential during switching as will be described below. Junction E is preferably at ground potential.

The operation of the invention may now be described. Assume that originally switch S is open and the state of the multivibrator is such that transistors $T_1$ and $T_2$ are non-conducting and conducting, respectively. Capacitor C is charged with a potential equal to the sum of the potentials of $B_1$ and $B_3$ less the drop across resistor $R_2$. Since transistor $T_1$ is non-conducting, junction A has a higher positive potential than point E, and junction D is negative. Consequently, current is supplied from conductor $V_3$ to the base of transistor $T_2$ via the parallel branch including load L and resistor $R_7$, and the series path including junction D and series resistor $R_5$. Since transistor $T_2$ is maintained conductive by this current flow, junction G is essentially at the same potential (ground) as junction E. Since resistors $R_3$ and $R_4$ constitute a potential divider connected at one end with ground and at the other end with the positive terminal of source $B_2$, the base of transistor $T_1$ is at a positive potential, and consequently the transistor is maintained non-conductive.

Upon closing of switch S, capacitor C discharges and the potentials of point $A_3$ and junctions $A_1$, A and D increase in a positive direction. As the potential of junction D increases, and as a consequence of the change in effective potential of the voltage divider consisting of resistors $R_5$ and $R_6$, the base of transistor $T_2$ becomes more positive so that transistor $T_2$ becomes non-conductive and transistor $T_1$ becomes conductive. Since transistor $T_2$ is non-conductive, current is supplied to the base of transistor $T_1$ via resistors $R_8$ and $R_3$ to maintain this transistor conductive. Consequently, a current flows through transistor $T_1$ and the load L.

In the event that point D becomes more positive than the potential at point E, $D_o$ becomes conductive, thereby preventing the collector of transistor $T_1$ from being exposed to an excessive positive potential when switch S is closed.

As long as switch S is closed, capacitor C discharges through resistor $R_1$ and load L. When the switch is opened, the capacitor C is recharged, and the system is ready for functioning after the triggering circuit has been returned to its original condition (for example, by applying a negative pulse to the base of transistor $T_2$). If the multivibrator circuit has not been returned to its original condition, capacitor C will discharge through resistance $R_1$ and load L every time switch S is activated. Resistance $R_7$ functions as a dummy load to ensure proper functioning of the arrangement, in the manner of a "memory," in the event that load L drops out. Of course, the polarities of the sources $B_1$, $B_2$ and $B_3$ are determined by whether PNP or NPN transistors are employed. As shown in the drawing, there is only one lead IU between the trigger circuit and the multivibrator.

While in accordance with the provisions of the Patent Statutes the preferred form and embodiment of the invention has been illustrated and described, it will be apparent to those skilled in the art that various changes and modifications may be made in the apparatus described without deviating from the invention set forth in the following claims.

What is claimed is:

1. A multivibrator triggering arrangement, comprising multivibrator circuit means including a direct-current voltage source and a pair of cross-connected electronic devices each having a pair of power circuit electrodes and a control electrode;
another direct-current voltage source having a higher potential than the multivibrator source;
a current-responsive load;
first conductor means connecting one terminal of said higher potential source with one end of said load;
second conductor means connecting the other terminal of said higher potential source with the other end of said load, said second conductor means including successively in series a first resistor $R_2$, a switch S and a second resistor $R_1$;
a capacitor connected at one end with said first conductor means and at the other end with a junction between said switch and said first resistor $R_2$, whereby said capacitor is connected in parallel with the series branch including said switch, said second resistor and said load;
and a single conductor connected at one end with the junction between said load and said second resistor $R_1$ at the other end with one power circuit electrode of one of the multivibrator electronic devices.

2. A multivibrator triggering arrangement, comprising
a trigger circuit including a first source of direct-current voltage $B_1$, a current-responsive load L, first conductor means $V_3$ connecting one terminal of said source with one end of said load, second conductor means $V_1$ connecting the other terminal of said first voltage source with the other terminal of said load, said second conductor means including successively in series a first resistor $R_2$, a switch S, and a second resistor $R_1$, and a capacitor C connected at one end with said first conductor means $V_3$ and at the other end with the junction $A_2$ between said first resistor and said switch;
a multivibrator circuit including a second source of direct-current voltage $B_3$ having a potential lower than that of said first source $B_1$, a pair of electronic devices each having a pair of power circuit electrodes and a control electrode, a pair of means, each including a resistor $R_7$, $R_8$, connecting corresponding first power circuit electrodes of said devices with said first conductor means $V_3$, respectively, means connecting the first power circuit electrode of each device with the control electrode of the other device, and means connecting one terminal of said second source $B_3$ with said first conductor means and the other terminal of said second source with the other power circuit electrode of each of said devices;
and a single conductor IU connected at one end with said trigger circuit at a junction $A_1$ between said load L and said second resistor $R_1$ and at the other end with the first power circuit electrode of one of said devices.

3. Apparatus as defined in claim 2 wherein said devices each comprises a transistor the base of which constitutes said control electrode.

4. Apparatus as defined in claim 3, and further including a diode connected at one end with said single conductor IU and at the other end with said other power circuit electrodes of said devices.

5. A multivibrator triggering arrangement, comprising
a trigger circuit including a first source of direct-current voltage $B_1$, a current-responsive load L, first conductor means $V_3$ connecting a first terminal of said source with one end of said load, second conductor means $V_1$ connecting the other terminal of said first voltage source with the other terminal of said load, said second conductor means including successively in series a first resistor $R_2$, a switch S, and a second resistor $R_1$, and a capacitor C connected at one end with said first conductor means $V_3$ and at the other end with the junction $A_2$ between said first resistor and said switch;
a multivibrator circuit including second $B_3$ and third $B_2$ sources of direct-current voltage each having a potential less than that of said first source $B_1$, a pair of transistors $T_1$, $T_2$ each having a pair of power circuit electrodes and a base electrode;
a first pair of resistors $R_7$, $R_8$ connecting corresponding first power circuit electrodes of said transistors, respectively, with said first conductor means $V_3$, a second pair of resistors $R_3$, $R_5$ connecting the first power circuit electrode of each transistor with the base electrode of the other transistor, respectively, means connecting the terminal of said second source $B_3$ corresponding with the first terminal of said first source $B_1$ with said first conductor means $V_3$, means connecting the other terminal of said second source $B_3$ with the other power circuit electrodes of said transistors, respectively, and with the terminal of said third source $B_2$ corresponding with the first terminal of said first source $B_1$, and a third pair of resistors $R_4$, $R_6$ connecting the base electrodes of said transistors with the other terminal of said third source $B_2$;
and a single conductor IU connected at one end with said trigger circuit at a junction $A_1$ between said load L and said second resistor $R_1$ and at the other end with the first power circuit electrodes of one $T_1$ of said transistors.

6. Apparatus as defined in claim 5 and further including a unidirectionally conductive device $D_0$ connected at one end with said single conductor IU and at the other end with the other power circuit electrode of said one transistor $T_1$.

References Cited by the Examiner

UNITED STATES PATENTS

| | | | |
|---|---|---|---|
| 2,719,226 | 9/1955 | Gordon et al. | 328—67 |
| 2,997,665 | 8/1961 | Sylvan | 307—88.5 |

ARTHUR GAUSS, *Primary Examiner.*